(12) United States Patent
Kim et al.

(10) Patent No.: US 12,738,589 B2
(45) Date of Patent: Sep. 15, 2026

(54) SECONDARY BATTERY ASSEMBLY AND SECONDARY BATTERY ASSEMBLY MODULE HAVING SAME

(71) Applicant: SK ON CO., LTD., Seoul (KR)

(72) Inventors: Dong Jin Kim, Daejeon (KR); Ik Sang Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 910 days.

(21) Appl. No.: 18/084,040

(22) Filed: Dec. 19, 2022

(65) Prior Publication Data

US 2023/0207949 A1 Jun. 29, 2023

(30) Foreign Application Priority Data

Dec. 23, 2021 (KR) ........................ 10-2021-0186077

(51) Int. Cl.
*H01M 50/30* (2021.01)
*H01M 10/52* (2006.01)
(Continued)

(52) U.S. Cl.
CPC ......... *H01M 50/30* (2021.01); *H01M 50/531* (2021.01); *H01M 10/52* (2013.01); *H01M 50/105* (2021.01); *H01M 50/186* (2021.01); *H01M 50/211* (2021.01); *H01M 50/367* (2021.01); *H01M 2200/20* (2013.01)

(58) Field of Classification Search
CPC .. H01M 50/30; H01M 50/531; H01M 50/103; H01M 50/15; H01M 50/186; H01M 50/209; H01M 50/211; H01M 50/3425; H01M 50/367; H01M 50/55; H01M 50/553; H01M 50/105; H01M 50/136; H01M 50/178; H01M 50/233; H01M 50/35; H01M 50/548; H01M 2200/20; H01M 2220/20; H01M 10/4235; H01M 10/0413; H01M 10/0436; H01M 10/0481; H01M 10/52; H01M 10/6553; H01M 10/6566; H01M 10/0431
See application file for complete search history.

(56) References Cited

FOREIGN PATENT DOCUMENTS

| | | | |
|---|---|---|---|
| JP | 2011-44332 | A | 3/2011 |
| KR | 10-1425569 | B1 | 8/2014 |

(Continued)

OTHER PUBLICATIONS

Office Action for Korean Patent Application No. 10-2021-0186077 issued by the Korean Patent Office on May 26, 2025.

(Continued)

*Primary Examiner* — Matthew W Van Oudenaren
(74) *Attorney, Agent, or Firm* — IP&T GROUP LLP

(57) ABSTRACT

Proposed is a secondary battery assembly. A secondary battery assembly according to an embodiment includes a secondary battery having, at an end or each end thereof, an electrode tab including a tab sealing part, and a side sealing part bent on a side surface thereof to a predetermined length, and a venting delay device including a protrusion formed to be spaced apart and face the bent side sealing part. According to the embodiment, it is possible to effectively prevent and delay breakage of a fusion portion of a sealing part of a secondary battery from occurring due to pressure caused by discharge of gas generated inside the secondary battery.

7 Claims, 17 Drawing Sheets

(51) Int. Cl.

| | |
|---|---|
| ***H01M 50/105*** | (2021.01) |
| ***H01M 50/186*** | (2021.01) |
| ***H01M 50/211*** | (2021.01) |
| ***H01M 50/367*** | (2021.01) |
| ***H01M 50/531*** | (2021.01) |

(56) References Cited

FOREIGN PATENT DOCUMENTS

| | | | | |
|---|---|---|---|---|
| KR | 10-1465491 | B1 | | 11/2014 |
| KR | 10-1500222 | B1 | | 3/2015 |
| KR | 10-2015-0109726 | A | | 10/2015 |
| KR | 10-2017-0016746 | A | | 2/2017 |
| KR | 10-2019-0057472 | A | | 5/2019 |
| KR | 20190057472 | | * | 5/2019 |
| KR | 10-2018301 | B1 | | 9/2019 |
| KR | 10-2021-0051733 | A | | 5/2021 |
| KR | 10-2368696 | B1 | | 2/2022 |

OTHER PUBLICATIONS

Notice of Allowance for Korean Patent Application No. 10-2021-0186077 issued by the Korean Patent Office on Jan. 21, 2026.

* cited by examiner

SECONDARY BATTERY ASSEMBLY AND SECONDARY BATTERY ASSEMBLY MODULE HAVING SAME

CROSS REFERENCE TO RELATED APPLICATION

The present application claims priority to Korean Patent Application No. 10-2021-0186077, filed Dec. 23, 2021, the entire contents of which is incorporated herein for all purposes by this reference.

BACKGROUND OF THE INVENTION

Field of the Invention

The present disclosure relates to a secondary battery assembly and a secondary battery assembly module having the same.

Description of the Related Art

In general, a secondary battery is a battery that can repeatedly perform a charging process in which chemical energy is converted into electric energy and a discharging process which is the reverse of the charging process. Examples of the secondary battery include nickel-cadmium (Ni—Cd) battery, nickel-hydrogen (Ni-MH) battery, lithium-metal battery, lithium-ion (Li-Ion) battery, and lithium-ion polymer battery (Li-Ion Polymer Battery (hereinafter, referred to as LIPB)).

A secondary battery consists of a cathode, an anode, an electrolyte, and a separator. It generates and stores electricity using a difference in voltage between the cathode and anode that are made of different materials.

Recently, secondary batteries have attracted attention as a promising energy source as they have been widely used in various fields such as IT products, automobiles, and energy storage. Secondary batteries for IT products are required to have a long operable time, a small size, and a light weight, while secondary batteries for automobiles are required to have high power, durability, and safety (free from risk of explosion during use). In the field of energy storage, secondary batteries are used to store excess electricity which is generated through wind power or solar energy generation and may not be required to have highly advanced features.

In such secondary batteries, as gas is generated inside a battery and the gas pressure is transferred to the outside, a terrace portion of the battery swells, and eventually a fusion portion of a sealing part is broken. This venting of the gas exposes the battery to explosion and various electrical hazards.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Japanese Patent No. 2011-044332 A

SUMMARY OF THE INVENTION

Accordingly, the present disclosure has been made keeping in mind the above problems occurring in the related art, and an objective of the present disclosure is to provide a secondary battery assembly for preventing and delaying venting from occurring due to pressure caused by discharge of gas inside a secondary battery.

Another objective of the present disclosure is to provide a secondary battery assembly module for effectively securing and maintaining safety and operating life of a secondary battery module by controlling a venting timing when venting of a side sealing part occurs due to internal pressure of a secondary battery in the secondary battery module.

In order to achieve the above objectives, according to one aspect of the present disclosure, there is provided a secondary battery assembly including: a secondary battery having, at an end or each end thereof, an electrode tab including a tab sealing part, and a side sealing part bent on a side surface thereof to a predetermined length; and a venting delay device including a protrusion formed to be spaced apart from and face the bent side sealing part.

Here, the venting delay device may be spaced apart from the side sealing part by a height distance equal to or smaller than a bent length of the side sealing part, and the protrusion may be formed such that there exists an overlapping portion where a width of the protrusion and a bent width of the side sealing part, which face each other, overlap in a vertical direction.

According to another aspect of the present disclosure, there is provided a secondary battery assembly module including: a secondary battery module formed by stacking a plurality of secondary batteries in one direction; a first side cover and a second side cover covering a first side surface and a second side surface of the secondary battery assembly module, respectively; and an upper cover and a lower cover covering an upper portion and a lower portion of the secondary battery module, respectively, wherein each of the secondary batteries may have, at an end or each end thereof, an electrode tab including a tab sealing part, may be spaced apart from an inner surface of the upper cover by a predetermined distance, and may have a side sealing part bent on a side surface thereof, and a venting delay device may be provided, the venting delay device having a plurality of protrusions each of which is spaced apart from and faces the side sealing part of each of the secondary batteries stacked in one direction and being coupled to the inner surface of the upper cover.

Here, the venting delay device may have a flange extending from each end thereof, the flange at a first end of the venting delay device may be coupled to a first side coupling hole of the first side cover, and the flange at a second end of the venting delay device may be coupled to a second side coupling hole of the second side cover.

Furthermore, the venting delay device may be spaced apart from the side sealing part by a height distance equal to or smaller than a bent length of the side sealing part, and each of the protrusions may be formed such that there exists an overlapping portion where a width of the protrusion and a bent width of the side sealing part, which face each other, overlap in a vertical direction.

According to still another aspect of the present disclosure, there is provided a secondary battery assembly module including: a secondary battery module formed by stacking a plurality of secondary batteries in one direction; a first side cover and a second side cover covering a first side surface and a second side surface of the secondary battery assembly module, respectively; and an upper cover and a lower cover covering an upper portion and a lower portion of the secondary battery module, respectively, wherein each of the secondary batteries may have, at an end or each end thereof, an electrode tab including a tab sealing part, may be spaced apart from an inner surface of the upper cover by a predetermined distance, and may have a side sealing part bent on a side surface thereof, and a plurality of protrusions each of which is spaced apart from and faces the side sealing part of each of the secondary batteries stacked in one direction may be formed to protrude from the inner surface of the upper cover.

Here, each of the protrusions may be spaced apart from the side sealing part by a height distance equal to or smaller than a bent length of the side sealing part, and each of the protrusions may be formed such that there exists an overlapping portion where a width of the protrusion and a bent width of the side sealing part, which face each other, overlap in a vertical direction.

According to a modified aspect of the present disclosure, there is provided a secondary battery assembly including, a secondary battery having, at an end or each end thereof, an electrode tab including a tab sealing part, and a side sealing part protruding on a side surface thereof; and a venting delay device including an inner groove formed to face the side sealing part so as to allow the side sealing part to be inserted therein by a predetermined length.

Here, the venting delay device may be configured such that a width of the inner groove is formed to be equal to or smaller than a width of the side sealing part.

According to another modified aspect of the present disclosure, there is provided a secondary battery assembly module including: a secondary battery module formed by stacking a plurality of secondary batteries in one direction, a first side cover and a second side cover covering a first side surface and a second side surface of the secondary battery assembly module, respectively; and an upper cover and a lower cover covering an upper portion and a lower portion of the secondary battery module, respectively, wherein each of the secondary batteries may have, at an end or each end thereof, an electrode tab including a tab sealing part, may be spaced apart from an inner surface of the upper cover by a predetermined distance, and may have a protruding side sealing part, and a venting delay device may be provided, the venting delay device having a plurality of inner grooves each of which is spaced apart from and faces the side sealing part of each of the secondary batteries stacked in one direction and each of which allows the side sealing part of each of the secondary batteries to be inserted therein by a predetermined length.

Here, the venting delay device may have a flange extending from each end thereof the flange at a first end of the venting delay device may be coupled to a first side coupling hole of the first side cover, and the flange at a second end of the venting delay device may be coupled to a second side coupling hole of the second side cover.

Furthermore, the venting delay device may be configured such that a width of each of the inner grooves is formed to be equal to or smaller than a width of the side sealing part.

According to still another modified aspect of the present disclosure, there is provided a secondary battery assembly module including: a secondary battery module formed by stacking a plurality of secondary batteries in one direction; a first side cover and a second side cover covering a first side surface and a second side surface of the secondary battery assembly module, respectively; and an upper cover and a lower cover covering an upper portion and a lower portion of the secondary battery module, respectively, wherein each of the secondary batteries may have, at an end or each end thereof, an electrode tab including a tab sealing part, may be spaced apart from an inner surface of the upper cover by a predetermined distance, and may have a side sealing part bent on a side surface thereof, and a plurality of inner grooves each of which is spaced apart from and faces the side sealing part of each of the secondary batteries stacked in one direction and each of which allows the side sealing part of each of the secondary batteries to be inserted therein by a predetermined length may be formed in the inner surface of the upper cover.

Here, a width of each of the inner grooves may be formed to be equal to or smaller than a width of the side sealing part.

According to yet another aspect of the present disclosure, there is provided a secondary battery assembly module including: a secondary battery module formed by stacking a plurality of secondary batteries in one direction; a first side cover and a second side cover covering a first side surface and a second side surface of the secondary battery assembly module, respectively; an upper cover and a lower cover covering an upper portion and a lower portion of the secondary battery module, respectively; and a front cover and a rear cover covering a front surface and a rear surface of the secondary battery module, respectively, wherein each of the secondary batteries may have, on a front surface or a rear surface thereof, an electrode tab including a tab sealing part, and a side sealing part on a side surface thereof and a plurality of pressing bars each of which has opposite ends coupled to front cover and the rear cover, respectively, may be formed at a predetermined interval with the side sealing part interposed therebetween, wherein the interval may be formed to be equal to or smaller than a width of the side sealing part.

Here, the pressing bars may be formed in a circular rod shape.

The features and advantages of the present disclosure will be more clearly understood from the following detailed description when taken in conjunction with the accompanying drawings.

All terms or words used in the specification and claims have the same meaning as commonly understood by one of ordinary skill in the at to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the embodiment of the present disclosure, it is possible to effectively prevent and delay breakage of a fusion portion of a sealing part of a secondary battery from occurring due to pressure caused by discharge of gas generated inside the secondary battery.

Furthermore, it is possible to prevent and delay as much as possible breakage of the sealing part of the secondary battery from occurring due to pressure caused by discharge of gas inside the secondary battery, thereby preventing evaporation of an electrolyte solution inside the secondary battery and thus extending lifespan of the secondary battery.

Furthermore, it is possible to induce maximum expansion of a terrace portion due to discharge of gas inside the second battery, thereby delaying transfer of breaking pressure of the fusion portion as much as possible.

Furthermore, it is possible to implement a venting delay device by modifying and processing a conventional structure of a second battery module case, thereby realizing a more compact second battery assembly module and stably maintaining a venting delay effect.

Furthermore, it is possible to effectively prevent breakage of the fusion portion of the sealing part of the second battery due to gas generated inside the second battery, thereby more effectively securing operational performance and reliability of the second battery.

BRIEF DESCRIPTION OF THE DRAWINGS

The above and other objectives, features, and other advantages of the present disclosure will be more early understood from the following detailed description when taken in conjunction with the accompanying drawings, in which:

FIG. 8 is a perspective view illustrating the secondary battery assembly module according to the first embodiment of the present disclosure.

DETAILED DESCRIPTION OF THE INVENTION

Figure 1:
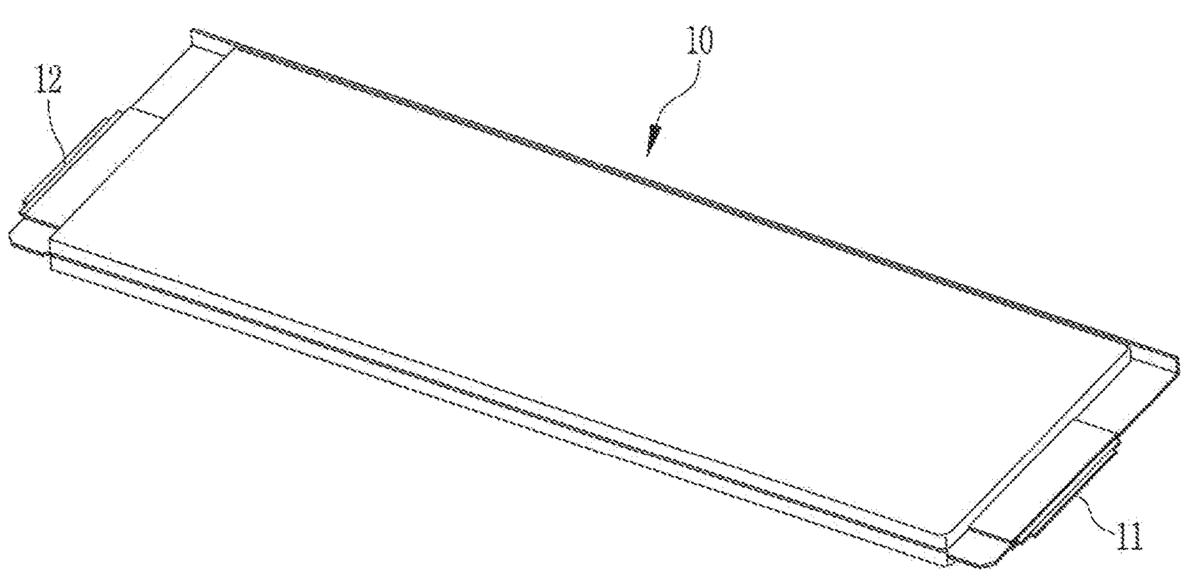
FIG. 1 is a perspective view illustrating a secondary battery according to an embodiment of the present disclosure.

The objectives, specific advantages, and novel features of the present disclosure will be more clearly understood from the following detailed description and preferable embodiments when taken in conjunction with the accompanying drawings. As for reference numerals associated with parts in the drawings, the same reference numerals will refer to the same or like parts throughout the drawings. Further, it will be understood that, although the terms "first surface", "second surface", "first", "second", etc. may be used only to distinguish one element from another element, these elements should not be limited by these terms. In the following description, a detailed description of related known configurations or functions may be omitted to avoid obscuring the subject matter of the present disclosure.

Hereinbelow, an exemplary embodiment of the present disclosure will be described in detail with reference to the accompanying drawings.

Figure 2:
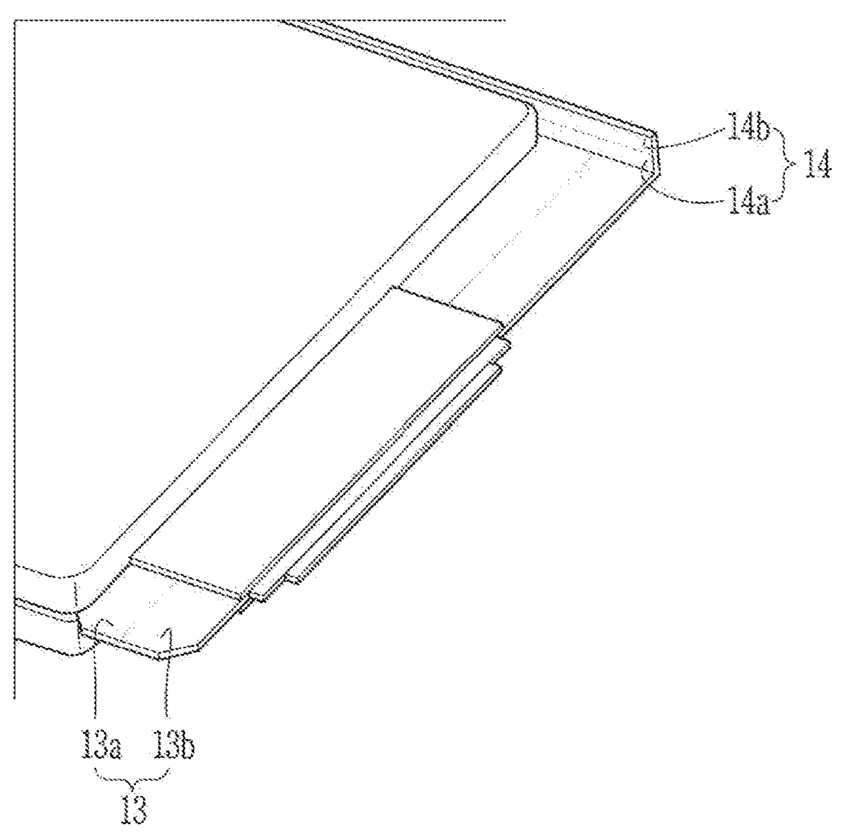
FIG. 2 is a partially enlarged view of FIG. 1.
Figure 3:
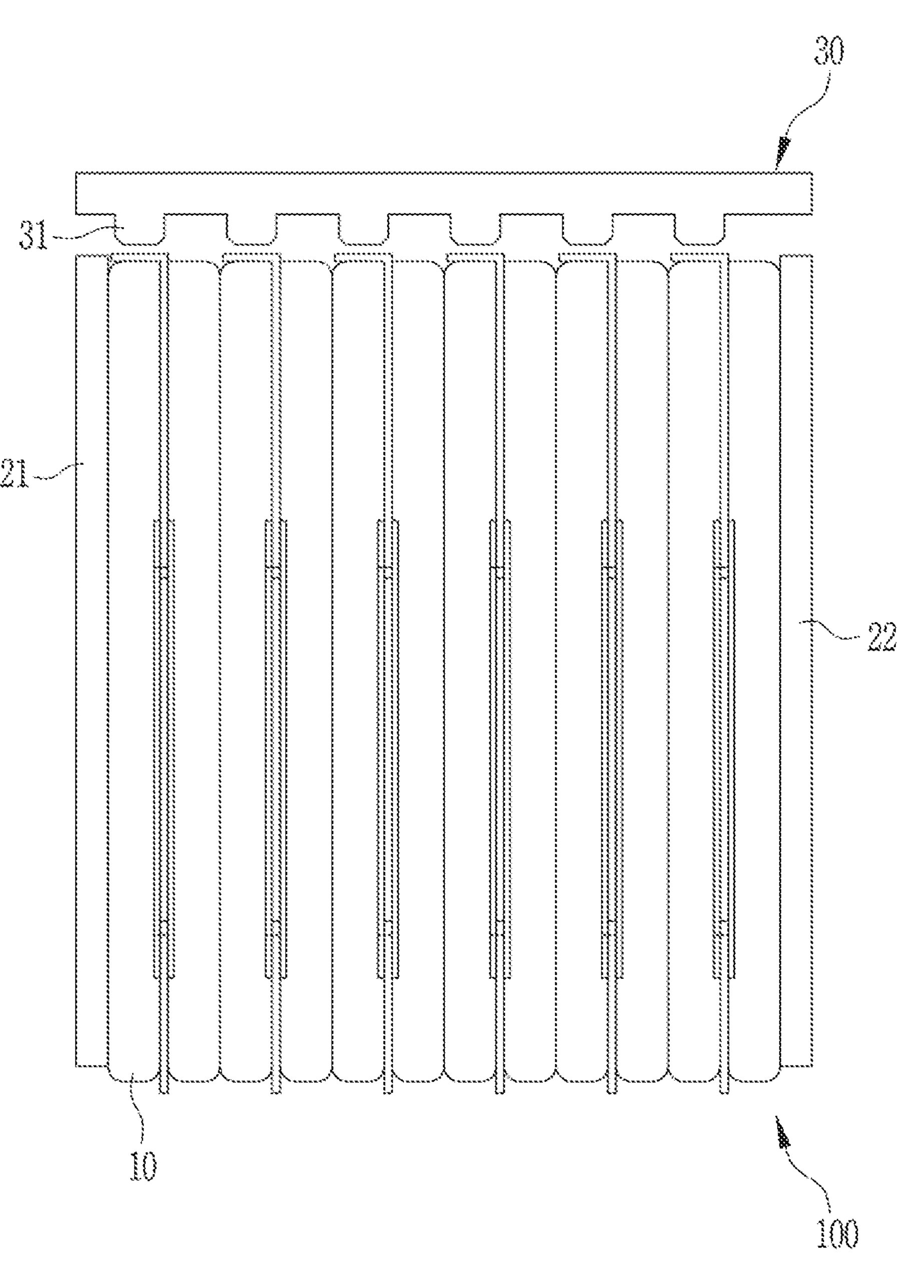
FIG. 3 is a front view illustrating a secondary battery assembly according to an embodiment of the present disclosure.
Figure 4:
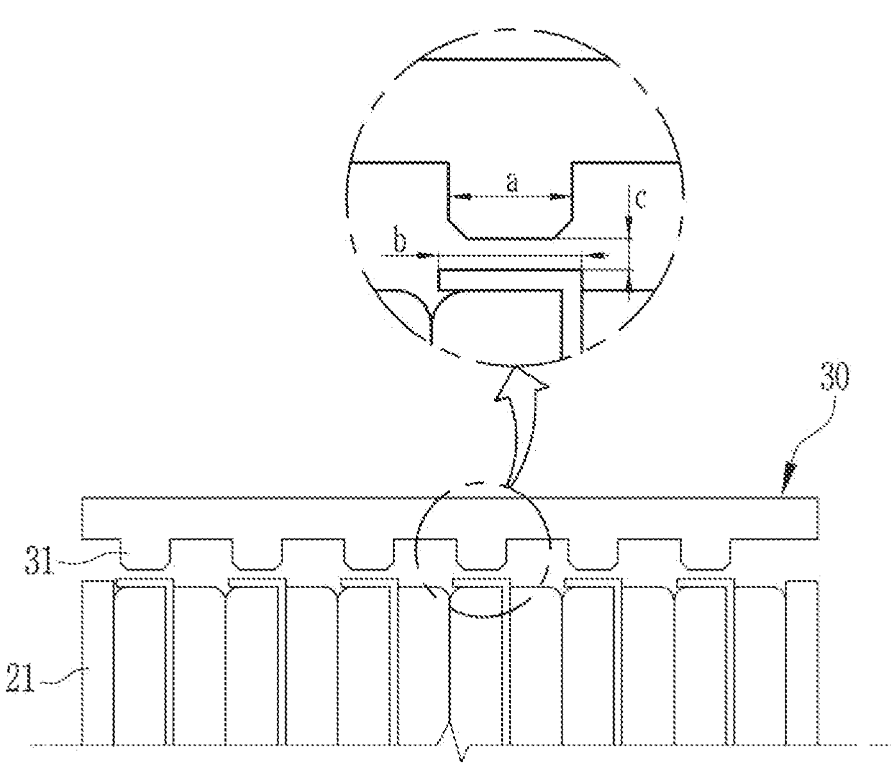
FIG. 4 is a partially enlarged view of FIG. 3.
Figure 5A:
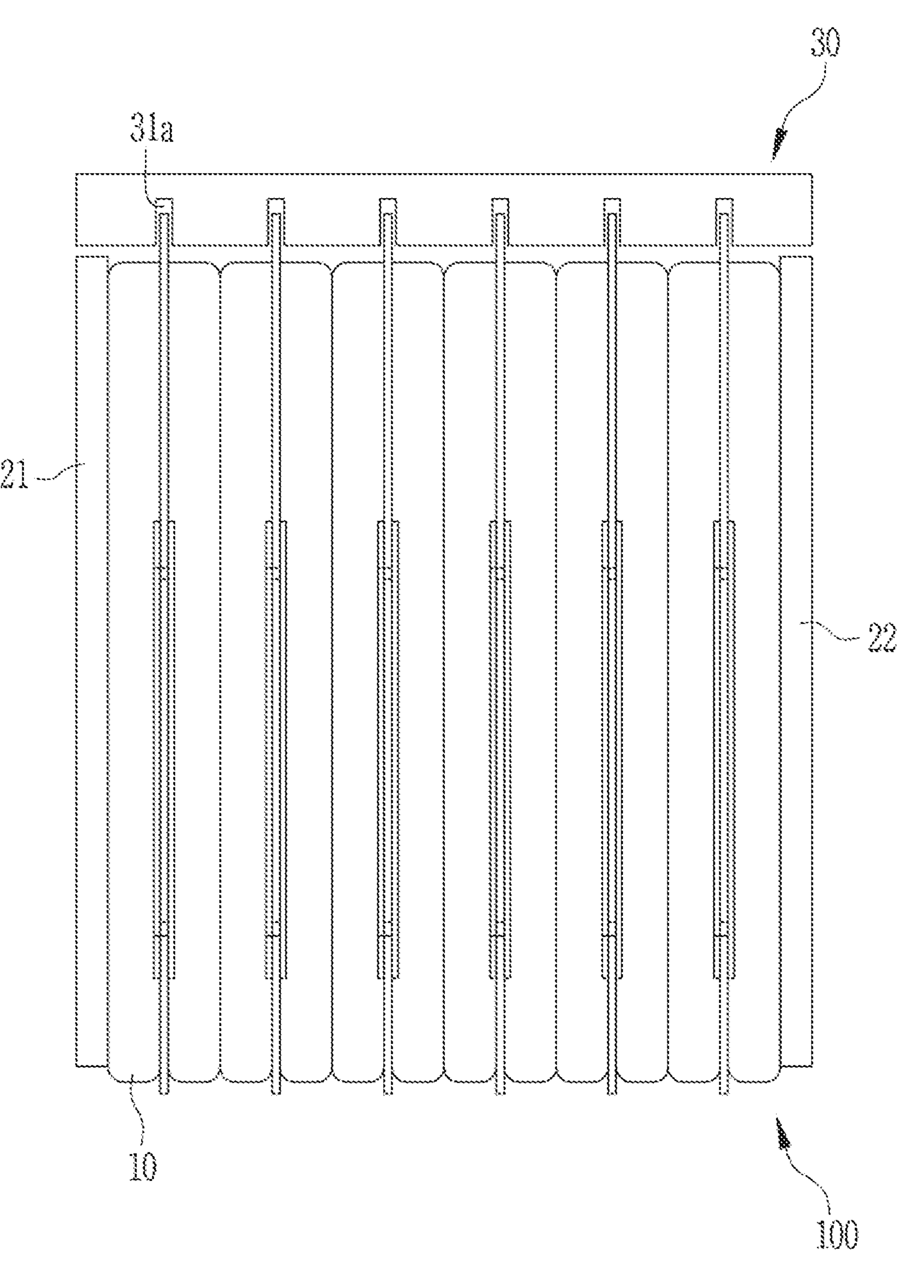
FIG. 5A is a front view illustrating a secondary battery assembly according to a modified example of the embodiment of the present disclosure.
Figure 5B:
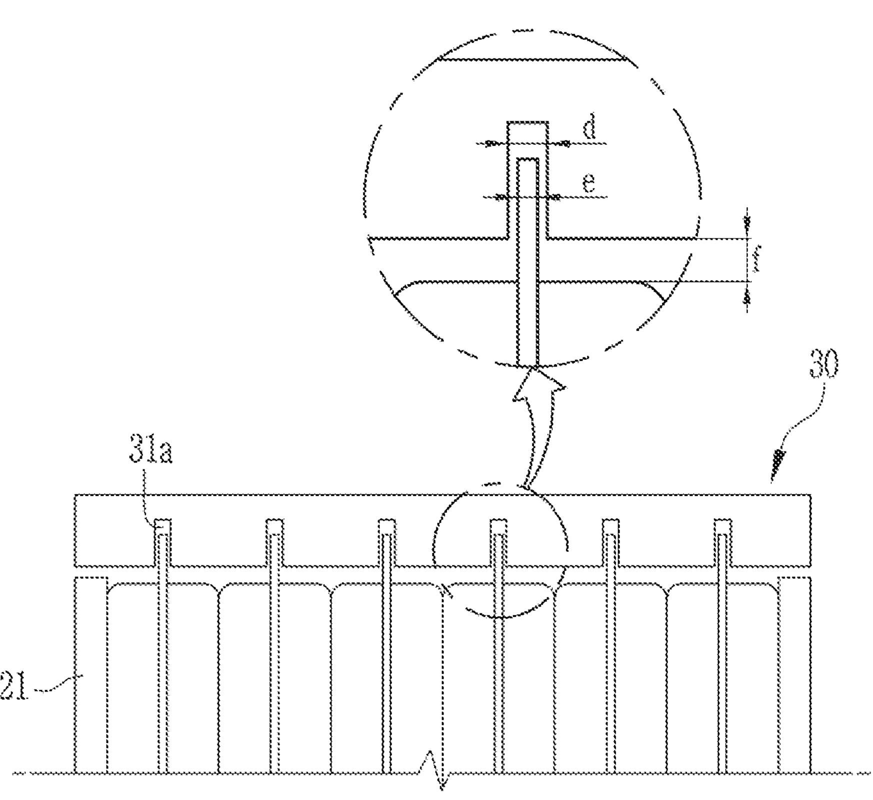
FIG. 5B is a partially enlarged view of FIG. 5A.
Figure 6A:
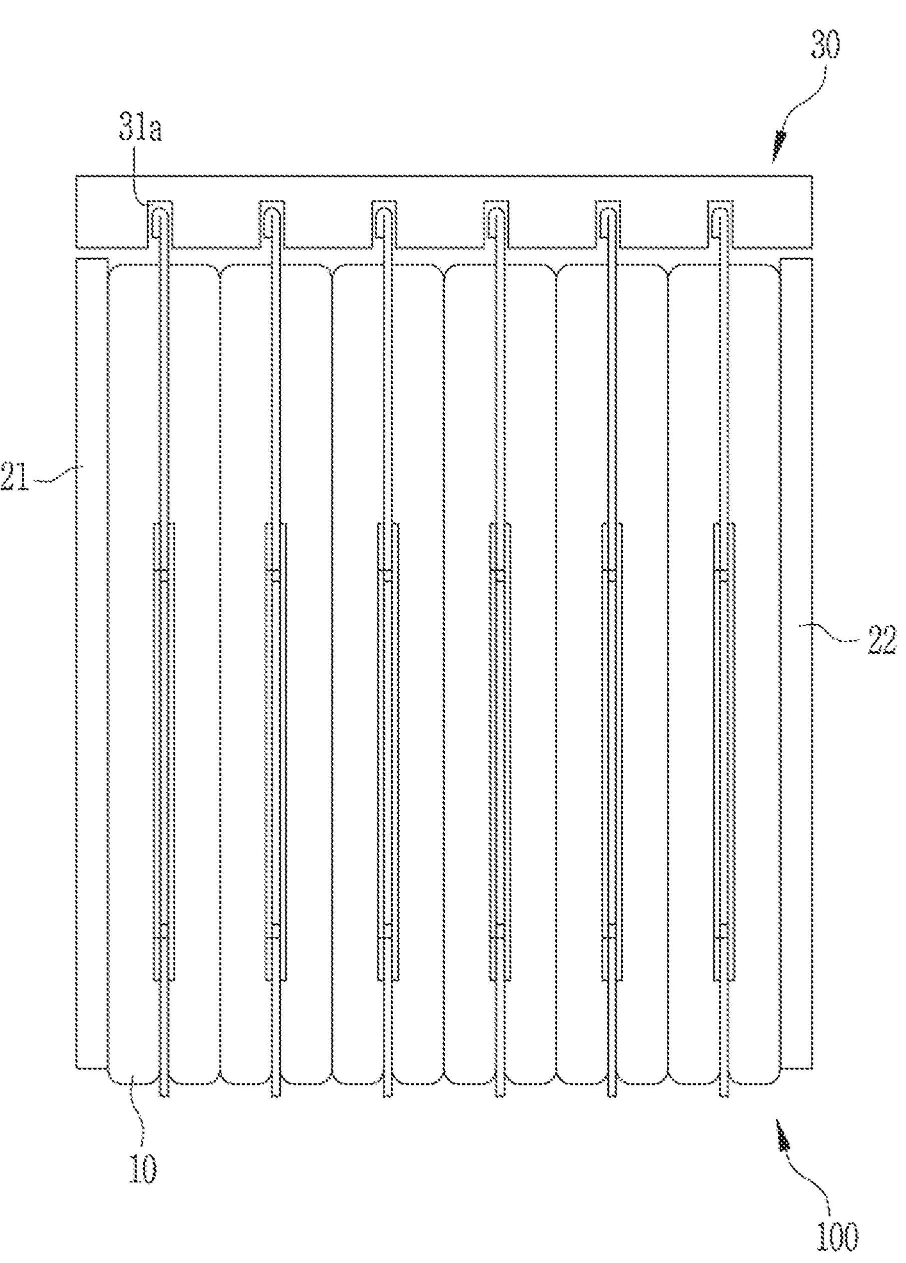
FIG. 6A is a front view illustrating a secondary battery assembly according to another modified example of the embodiment of the present disclosure.
Figure 6B:
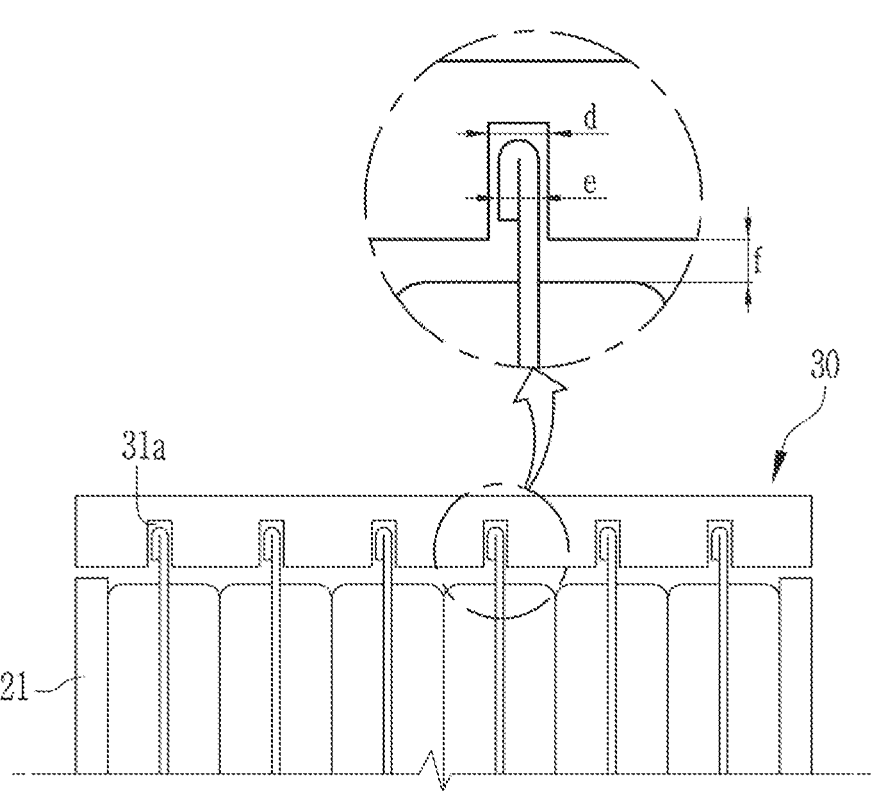
FIG. 6B is a partially enlarged view of FIG. 6A.

FIG. 1 is a perspective view illustrating a secondary battery 10 according to an embodiment of the present disclosure. FIG. 2 is a partially enlarged view of FIG. 1. FIG. 3 is a front view illustrating a secondary battery assembly according to an embodiment of the present disclosure. FIG. 4 is a partially enlarged view of FIG. 3. FIG. 5A is a front view illustrating a secondary battery assembly according to a modified example of the embodiment of the present disclosure. FIG. 5B is a partially enlarged view of FIG. 5A. FIG. 6A is a front view illustrating a secondary battery assembly according to another modified example of the embodiment of the present disclosure. FIG. 6B is a partially enlarged view of FIG. 6A.

The secondary battery assembly according to the embodiment of the present disclosure includes: a secondary battery 10 having, at an end or each end thereof an electrode tab including a tab sealing part 13, and a side sealing part 14 bent on a side surface thereof by a predetermined length, and a venting delay device 30 including a protrusion 31 spaced apart from and facing the bent side sealing part 14.

As illustrated in FIGS. 1 and 2, a first electrode tab 11 and a second electrode tab 12 having different polarities may be formed at opposite ends of the secondary battery 10, respectively. On the side surface of the secondary battery 10 other than the portions where the electrode tabs 11 and 12 are formed, the side sealing part 14 may be formed by a pouch case for accommodating an electrode assembly.

The shape of the illustrated secondary battery 10 is only one embodiment. Therefore, in the embodiment of the present disclosure, the shape of the secondary battery 10 is not limited to those of a secondary battery having a specific structure, and is universally applicable to a secondary battery which meets the purpose of the embodiment of the present disclosure. However, in this specification, the illustrated secondary battery 10 will be described as an example.

Each of the first electrode tab 11 and the second electrode tab 12 may have the tab sealing part 13 to which the pouch case is bonded. The tab sealing part 13 includes a tab terrace 13*a* serving as a non-adhesive portion where an inner space is formed and a tab fusion portion 13*b* to which the pouch case is adhered. The position and extent of the tab terrace 13*a* and the tab fusion portion 13*b* are not particularly limited.

The side sealing part 14 for sealing the pouch case may be formed on the side surface of the secondary battery 10 other than the first electrode tab 11 and the second electrode tab 12. The side sealing portion 14 also includes a side terrace 14*a* serving as a non-adhesive portion where an inner space is formed, and a side fusion portion 14*b* to which the pouch case is adhered.

In the embodiment of the present disclosure, an embodiment in which the side sealing portion 14 is bent by a predetermined length on the side surface or an embodiment in which the side sealing portion 14 is not bent will be described. However, the position or range of positions of a bent portion is not limited to a specific portion of the side terrace 14*a* or the side fusion portion 14*b*.

The tab sealing part 13 or the side sealing part 14 includes the tab fusion portion 13*b* and the side fusion portion 14*b* at respective ends thereof. When an internal pressure is increased by high temperature of the secondary battery 10 or gas that may be generated in the course of charging and discharging, a serious problem in which the fusion portions 13*b* and 14*b* of the sealing parts 13 and 14 are broken may occur.

The embodiment of the present disclosure provides the secondary battery assembly including the venting delay device 30 in the secondary battery 10 so as to significantly reduce the risk of the secondary battery 10 while effectively preventing the breakage of the fusion portions 13*b* and 14*b*.

First, as illustrated in FIGS. 3 and 4, the venting delay device 30 includes the protrusion 31 formed to be spaced apart by a predetermined distance c from a bent portion of the side sealing part 14 so that the protrusion 31 and the bent portion of the side sealing part 14 face each other. The protrusion 31 is spaced apart from the side sealing part 14 by a height distance equal to or smaller than a bent length b of the side sealing part 14. With this structure, when the bent portion of the side sealing part 14 is unfolded as the side sealing part 14 expands by the internal pressure, the bent portion may be pressed by the protrusion 31 at an appropriate distance.

Therefore, there has to exist an overlapping portion where a width a of the protrusion 31 and a width b of the bent portion of the side sealing part 14, which face each other, at least overlap in the vertical direction. This is because, when the bent portion of the side sealing part 14 is unfolded, the breakage of the side fusion portion 14*b* may be prevented and delayed by an effective pressing action of the protrusion 31.

Specifically, the material of the venting delay device 30 may be selected from any one or a combination of a thermoplastic resin having heat resistance, water resistance, and insulation properties, a material having heat dissipation properties such as aluminum silicate (mica), and a metal material.

FIGS. 5A and 5B are views illustrating a modified example of the venting delay device 30 according to the embodiment of the present disclosure. FIGS. 6A and 6B are views illustrating another modified example of the venting delay device 30 according to the embodiment of the present disclosure.

As illustrated in FIGS. 5A and 5B, a venting delay device 30 may include an inner groove 31*a* into which a side sealing part 14 of a secondary battery 10 protruding in an unbent state is inserted by a predetermined length. The venting delay device 30 may be formed so that a portion of the side sealing part 14 is inserted into the inner groove 31*a* in a state in which the venting delay device 30 has a predetermined distance f from the side sealing part 14.

A width d of the inner groove 31*a* may be formed to be equal to or smaller than a width e of the side sealing part 14 so as to be coupled to the side sealing part 14 in a structure that presses opposite side surfaces of the side sealing part 14 or in a structure capable of preventing and delaying the side sealing part 14 from expanding laterally in a state in which the side sealing part 14 is received at least in the inner groove 31*a*.

As illustrated in FIGS. 6A and 6B, a side sealing part 14 of a secondary battery 10 may protrude in a shape with an upper portion bent and protruded and may be inserted into an inner groove 31*a* by a predetermined length. As illustrated in FIGS. 6A and 6B, the side sealing part 14 may be formed in a shape in which the upper portion thereof is bent and protruded, so that the shape and depth of the inner groove 31*a* may be appropriately adjusted by adjusting the degree of bending. Also, the effect of venting delay may be effectively maintained.

A width d of the inner groove 31*a* may be formed to be equal to or smaller than a width e of the bent and protruded portion of the side sealing part 14 so as to be coupled to the side sealing part 14 in a structure that presses opposite side surfaces of the side sealing part 14 or in a structure capable of preventing and delaying the side sealing part 14 from expanding laterally in a state in which the bent and protruded portion of the side sealing part 14 is received at least in the inner groove 31*a*.

Figure 7:
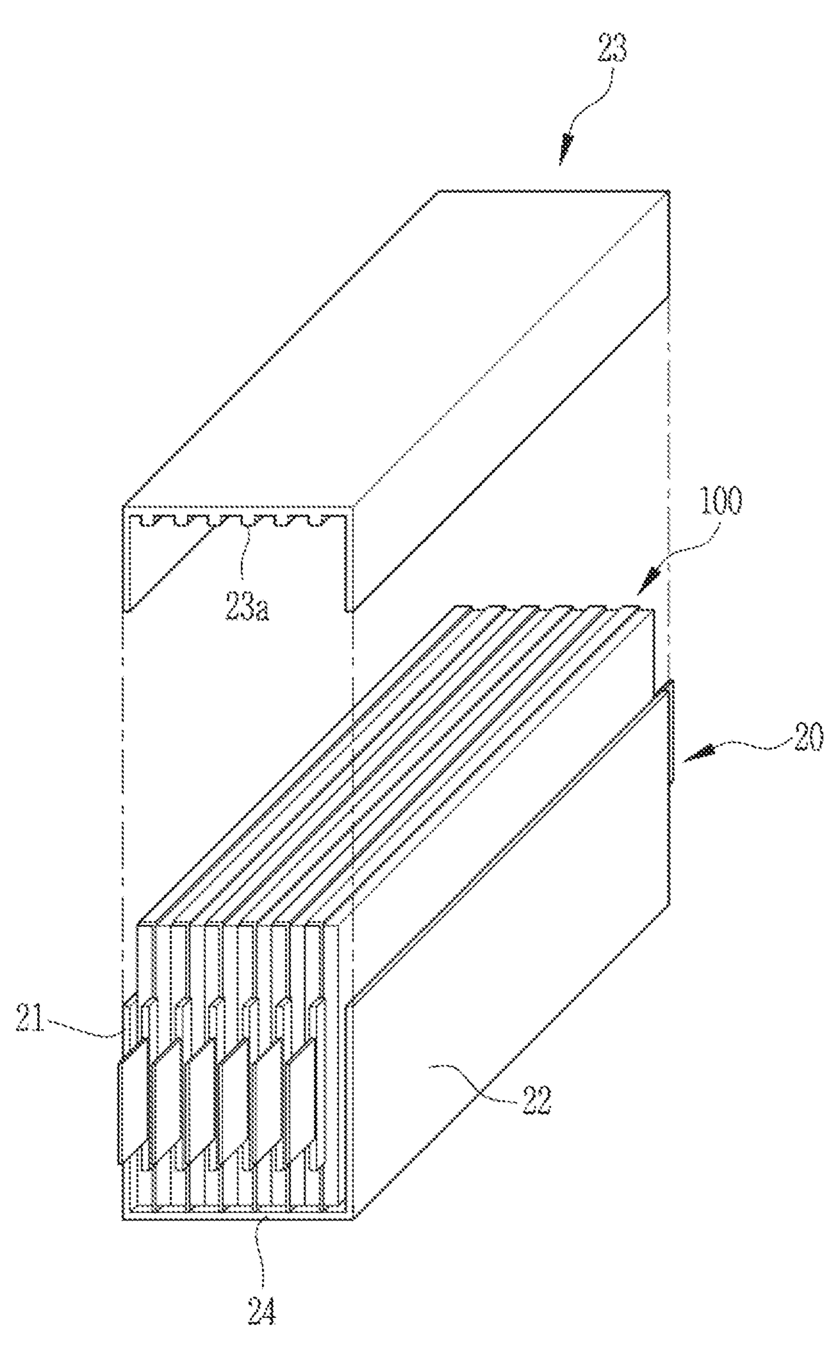
FIG. 7 is an exploded perspective view illustrating a secondary battery assembly module according to a first embodiment of the present disclosure.
Figure 8:
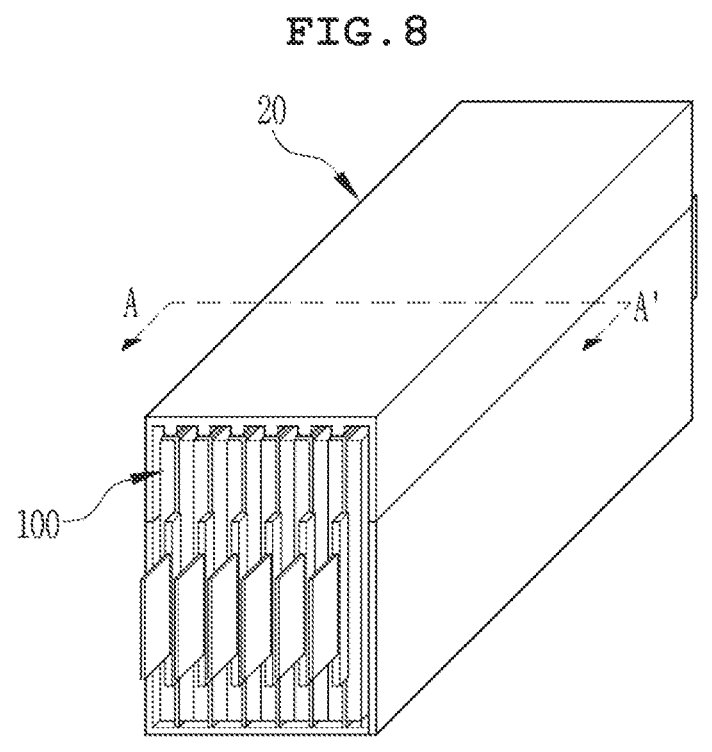
Figure 9:
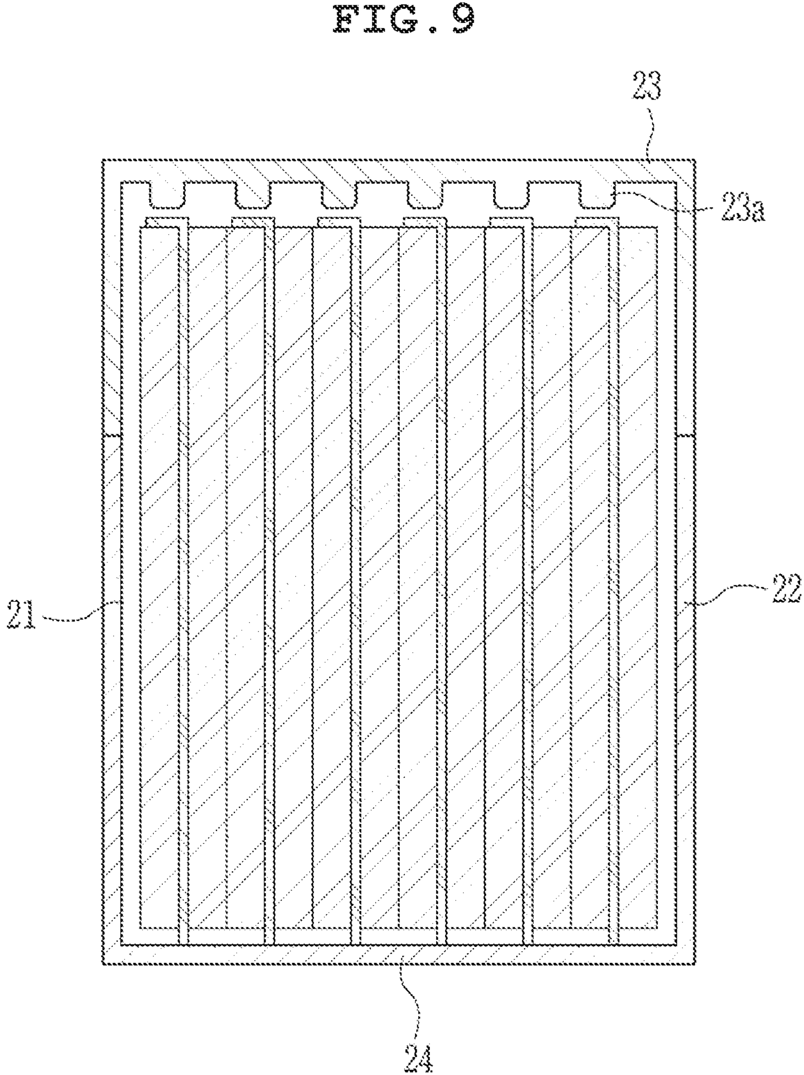
FIG. 9 is a sectional view taken along line AA' of FIG. 8.

FIG. 7 is an exploded perspective view illustrating a secondary battery assembly module according to a first embodiment of the present disclosure. FIG. 8 is a perspective view illustrating the secondary battery assembly module according to the first embodiment of the present disclosure. FIG. 9 is a sectional view taken along line AA' of FIG. 8.

The secondary battery assembly module according to the first embodiment of the present disclosure may include: a secondary battery module formed by stacking a plurality of secondary batteries 10 in one direction; a first side cover 21 and a second side cover 22 covering a first side surface and a second side surface of the secondary battery assembly module, respectively, and an upper cover 23 and a lower cover 24 covering an upper portion and a lower portion of the secondary battery module, respectively. Each of the secondary batteries 10 may have, at an end or each end thereof, an electrode tab including a tab sealing part 13, may be spaced apart from an inner surface of the upper cover 23 by a predetermined distance, and may have a side sealing part 14 bent on a side surface thereof. A plurality of protrusions 23*a* each of which is spaced apart from and faces the bent side sealing part 14 of each of the secondary batteries 10 stacked in one direction may be formed to protrude from the inner surface of the upper cover 23.

As illustrated in FIG. 7, the upper cover 23 itself has the protrusions 23*a* protruding from the inner surface thereof. The protrusions 23*a* may be formed to be spaced apart from each other in one direction where the secondary batteries 10 of the secondary battery module are stacked so as to correspond to the secondary batteries 10, respectively.

As illustrated in FIG. 8, the upper cover 23 is seated and coupled to an upper portion of the secondary battery module to form the secondary battery assembly module.

Referring to FIG. 9 illustrating the section taken along line AA' of FIG. 8, each of the protrusions 23*a* protruding from the inner surface of the upper cover 23 is formed to be spaced apart from and correspond to a bent portion of the side sealing part 14 of each of the secondary batteries 10, so that when the bent portion of the side sealing part 14 is unfolded due to an internal gas pressure, the protrusion 23*a* may press the bent portion downwards to prevent and delay venting of the side sealing part 14.

The protrusion 23*a* is spaced apart from the bent side sealing part 14 in the vertical direction, that is, in the up-and-down direction, by a distance equal to or smaller than a bent length of the side sealing part 14. With this structure, the bent side sealing part 14 may receive a pressing force through an appropriate distance from the protrusion 23*a* when the bent portion is unfolded by the internal gas pressure, thereby effectively delaying and preventing the venting of the gas in the secondary battery 10 to the outside.

Furthermore, the protrusion 23*a* and the side sealing part 14 may be arranged such that there exists an overlapping portion where a width of the protrusion 23*a* and a bent width of the side sealing part 14, which face each other, overlap in the vertical direction, thereby maintaining and operating a more effective pressing action of the protrusion 23*a* against the side sealing part 14.

In addition, the first side cover 21 and the second side cover 22 are coupled to the first side surface and the second side surface of the secondary battery module, respectively, to support the secondary battery module. A description of the structure of the secondary batteries 10 and the same configuration already described above will be omitted.

Here, the upper cover 23 and the lower cover 24 are only separated and named for limiting the position of a secondary battery module case. The upper cover 23 and the lower cover 24 may be integrated to form a single case, and the upper cover 23 and the lower cover 24 are not necessarily limited to being physically separated and coupled.

Figure 10:
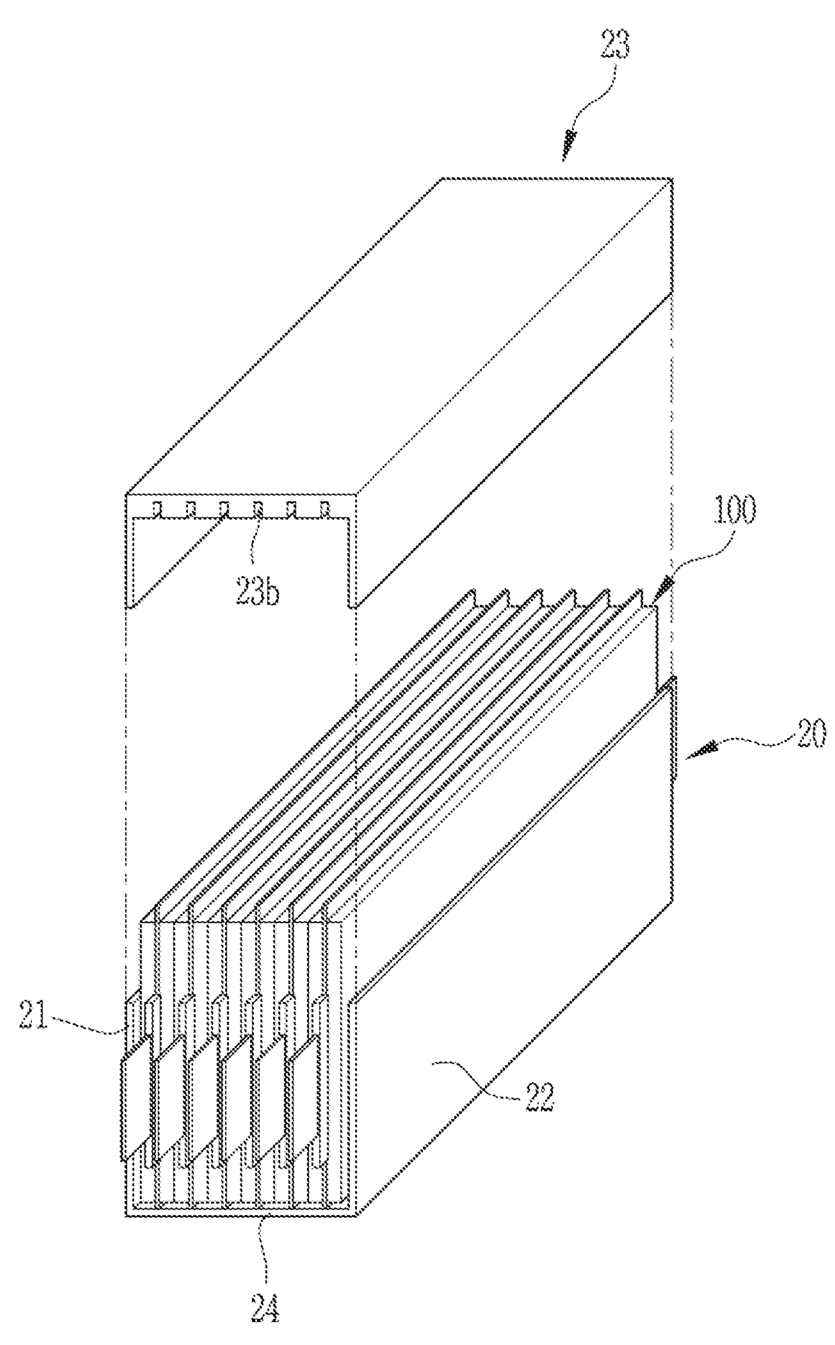
FIG. 10 is an exploded perspective view illustrating a secondary battery assembly module according to a modified example of the first embodiment of the present disclosure.
Figure 11:
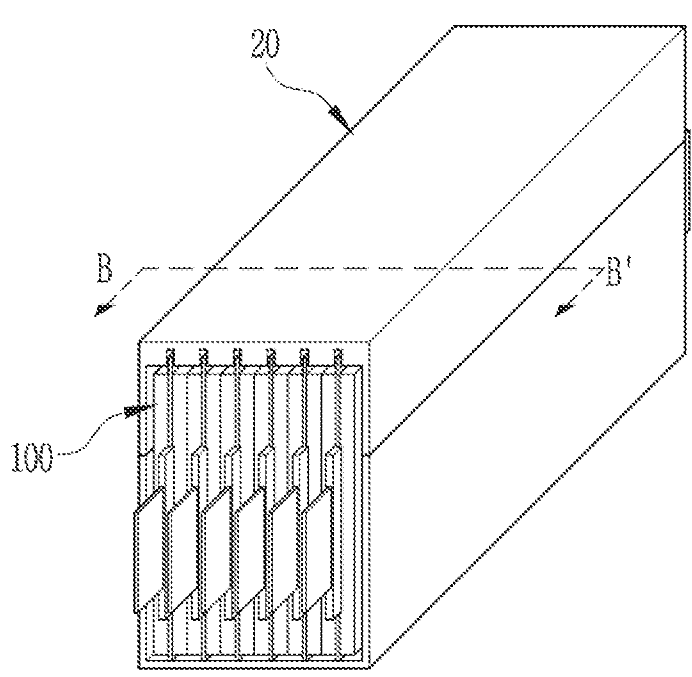
FIG. 11 is a perspective view illustrating the secondary battery assembly module according to the modified example of the first embodiment of the present disclosure.
Figure 12:
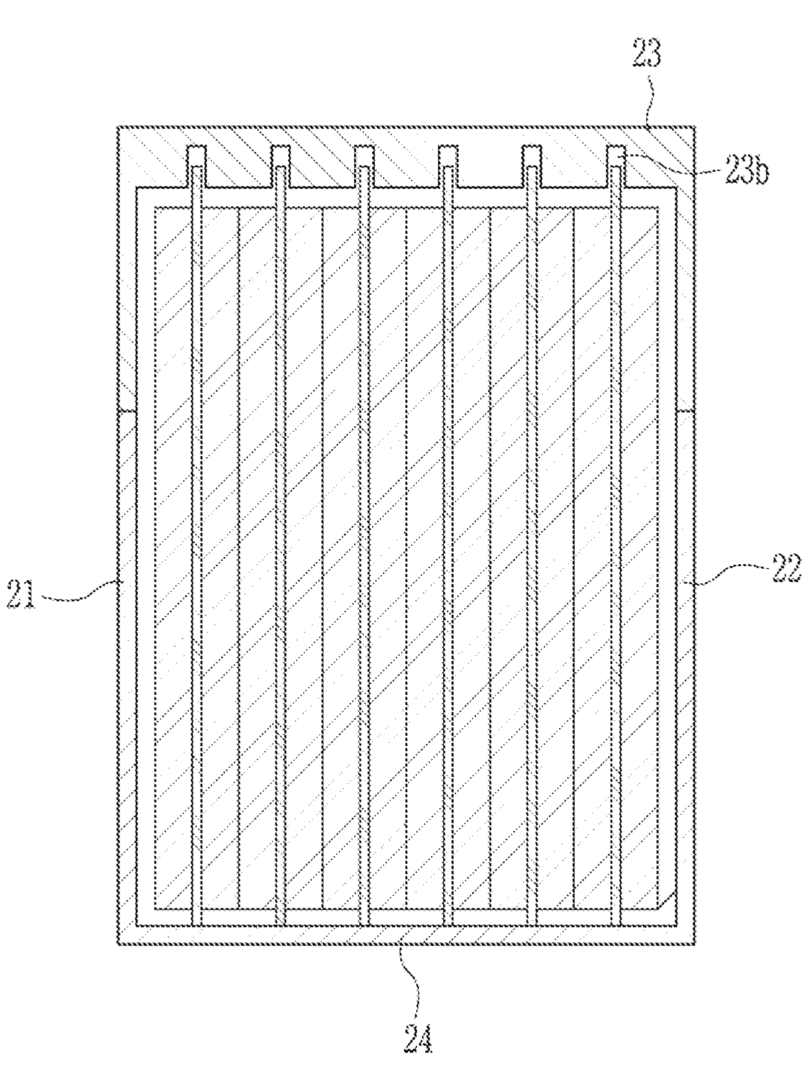
FIG. 12 is a sectional view taken along line BB' of FIG. 11.

FIG. 10 is an exploded perspective view illustrating a secondary battery assembly module according to a modified example of the first embodiment of the present disclosure. FIG. 11 is a perspective view illustrating the secondary battery assembly module according to the modified example of the first embodiment of the present disclosure. FIG. 12 is a sectional view taken along line BB' of FIG. 11.

The secondary battery assembly module according to the modified example of the first embodiment of the present disclosure may include: a secondary battery module formed by stacking a plurality of secondary batteries 10 in one direction; a first side cover 21 and a second side cover 22 covering a first side surface and a second side surface of the secondary battery module, respectively; and an upper cover 23 and a lower cover 24 covering an upper portion and a lower portion of the secondary battery module, respectively. Each of the secondary batteries 10 may have, at an end or each end thereof, an electrode tab including a tab sealing part 13, may be spaced apart from an inner surface of the upper cover 23 by a predetermined distance, and may have a side sealing part 14 on a side surface thereof. A plurality of inner grooves 23*b* each of which is spaced apart from and faces the side sealing part 14 of each of the secondary batteries 10 stacked in one direction and each of which allows the side sealing part 14 to be inserted therein may be formed in the inner surface of the upper cover 23.

In the modified example of the first embodiment, in a state in which the side sealing part 14 of each of the secondary batteries 10 protrudes on the side surface of the secondary battery 10 in an unbent state, it is inserted into each of the inner grooves 23*b* by a predetermined length, so that a side fusion portion 14*b* of the inserted side sealing part 14 is prevented and delayed as much as possible from breaking by expansion due to an internal gas pressure.

Furthermore, as illustrated in FIGS. 10 and 11, the upper cover 23 of a secondary battery case 20 itself may have the inner grooves 23*b* formed therein. The inner grooves 23*b* may be formed in the inner surface of the upper cover 23 without a separate member, so that a more compact secondary battery assembly module may be implemented.

As illustrated in FIG. 12, a width (see d in FIG. 5B) of each of the inner grooves 23*b* may be formed to be equal to a width of the side sealing part 14 so as to allow the side sealing part 14 to be inserted therein by a predetermined length. Alternatively, the width (see d in FIG. 5B) of each of the inner grooves 23*b* may be formed to be smaller than the width (see e in FIG. 5B) of the side sealing part 14 so as to allow the side sealing part 14 inserted into the inner groove 23*b* to receive a predetermined pressing force laterally. Thus, a tighter coupling structure may be formed.

When the width of the inner groove 23*b* is formed to be smaller than that of the side sealing part 14 to be inserted, an insertion portion of the inner groove 23*b* may be separately assembled when the upper cover 23 is manufactured so as to pressably receive the side sealing part 14 therein. Of course, various other manufacturing methods and assembly methods may also be adopted.

Figure 13:
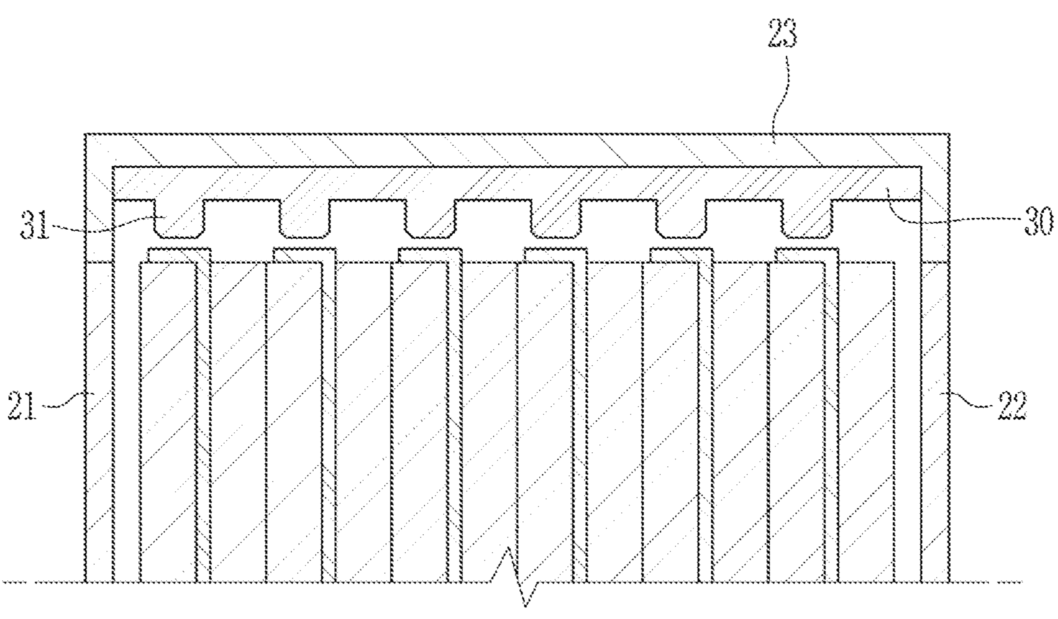
FIG. 13 is a partial sectional view illustrating a secondary battery assembly module according to a second embodiment of the present disclosure.
Figure 14:
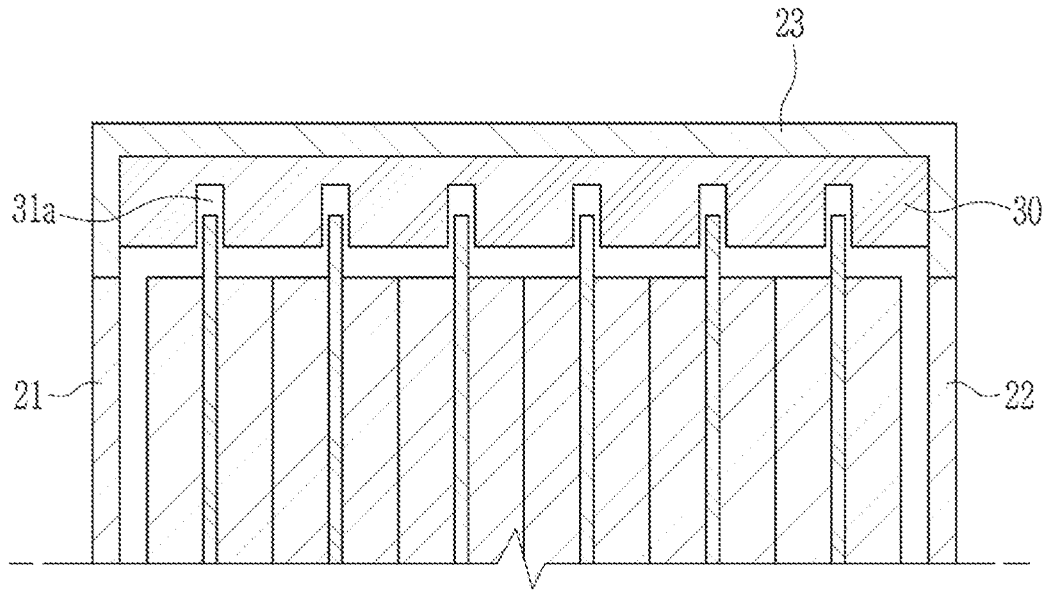
FIG. 14 is a partial sectional view illustrating a secondary battery assembly module according to a modified example of the second embodiment of the present disclosure.

FIG. 13 is a partial sectional view illustrating a secondary battery assembly module according to a second embodiment of the present disclosure. FIG. 14 is a partial sectional view illustrating a secondary battery assembly module according to a modified example of the second embodiment of the present disclosure.

The secondary battery assembly module according to the second embodiment of the present disclosure has a structure in which a venting delay device 30 is separately attached and coupled to an upper cover 23. When the venting delay device 30 is separately attached to the upper cover 23, there is an advantage of effectively utilizing the advantages obtained by selecting the material and physical properties of the venting delay device 30 for electrical safety of a secondary battery module or ease of coupling with the side sealing part 14. Also, there is another advantage of increasing the degree of freedom in design by applying the venting delay device 30 having specifications modified to suit the specifications of various secondary battery modules.

As illustrated in FIG. 13, the venting delay device 30 having a protrusion 31 formed thereon may be coupled to an inner surface of the upper cover 23. In FIG. 14, a venting delay device 30 having an inner groove 31*a* therein may also be coupled to an inner surface of an upper cover 23. The coupling between the venting delay device 30 and the inner surface of the upper cover 23 may be implemented by various known coupling methods such as bonding or other adhesive tapes. Of course, an appropriate adhesive may be selected and adopted according to the material or physical properties of the venting delay device 30.

Figure 15:
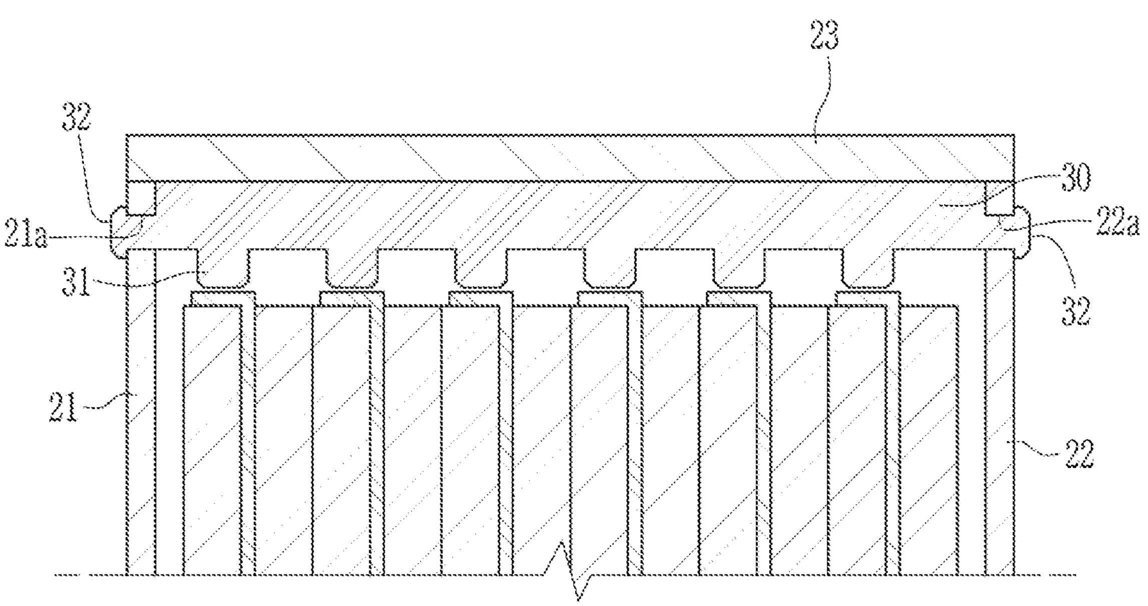
FIG. 15 is a partial sectional view illustrating a secondary battery assembly module according to a third embodiment of the present disclosure.
Figure 16:
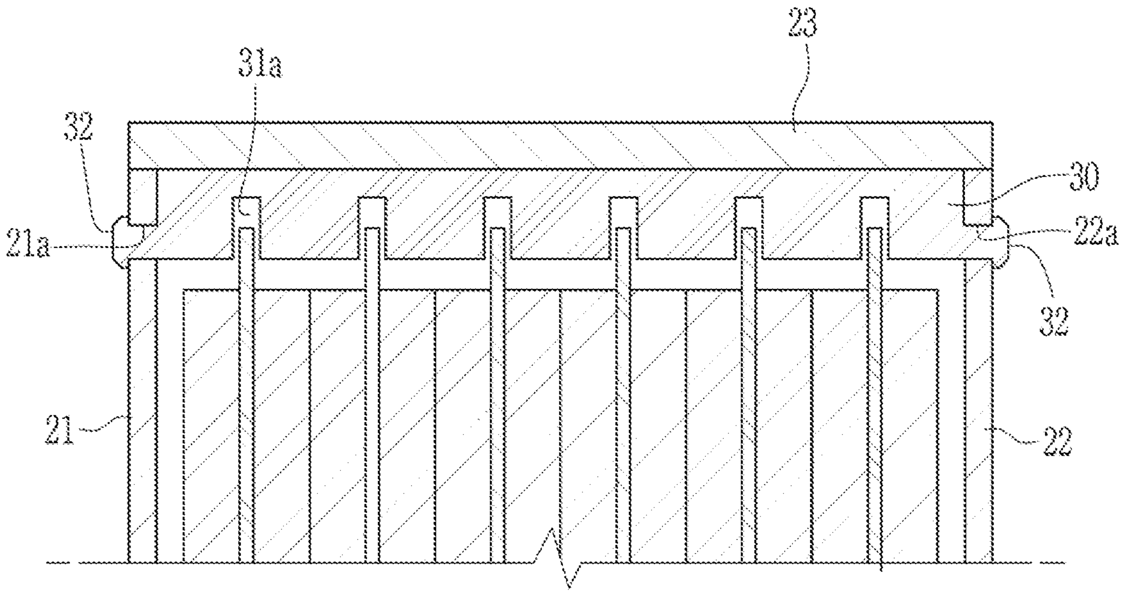
FIG. 16 is a partial sectional view illustrating a secondary battery assembly module according to a modified example of the third embodiment of the present disclosure.

FIG. 15 is a partial sectional view illustrating a secondary battery assembly module according to a third embodiment of the present disclosure. FIG. 16 is a partial sectional view illustrating a secondary battery assembly module according to a modified example of the third embodiment of the present disclosure.

The third embodiment of the present disclosure an embodiment in which coupling between the venting delay device 30 and the upper cover 23 in the second embodiment described above is modified, and a physical coupling structure is added on a first side cover 21 and a second side cover 22 coupled to opposite side surfaces of a secondary battery module, rather than simply bonding to the inner surface of the upper cover 23.

Specifically, as illustrated in FIG. 15, a venting delay device 30 may have a flange 32 extending from each end thereof. The respective flanges 32 may be fitted into a first side coupling hole 21*a* of a first side cover 21 and a second side coupling hole 22*a* of a second side cover 22, thereby more stably maintaining a venting delay action on a side sealing part 14 of a secondary battery 10 through a more robust coupling.

In FIG. 16, a venting delay device 30 having an inner groove 31*a* therein may also have a flange 32 extending from each end thereof. The respective flanges 32 may be fitted into a first side coupling hole 21*a* of a first side cover 21 and a second side coupling hole 22*a* of a second side cover 22.

In addition, a coupling structure or relationship between the protrusion 31 and the side sealing part 14 of the secondary battery 10, and a coupling structure or relationship between the inner groove 31*a* and the side sealing part 14 of the secondary battery 10, etc. remain the same as those already described above, and thus a repetitive description thereof will be omitted.

Figure 17:
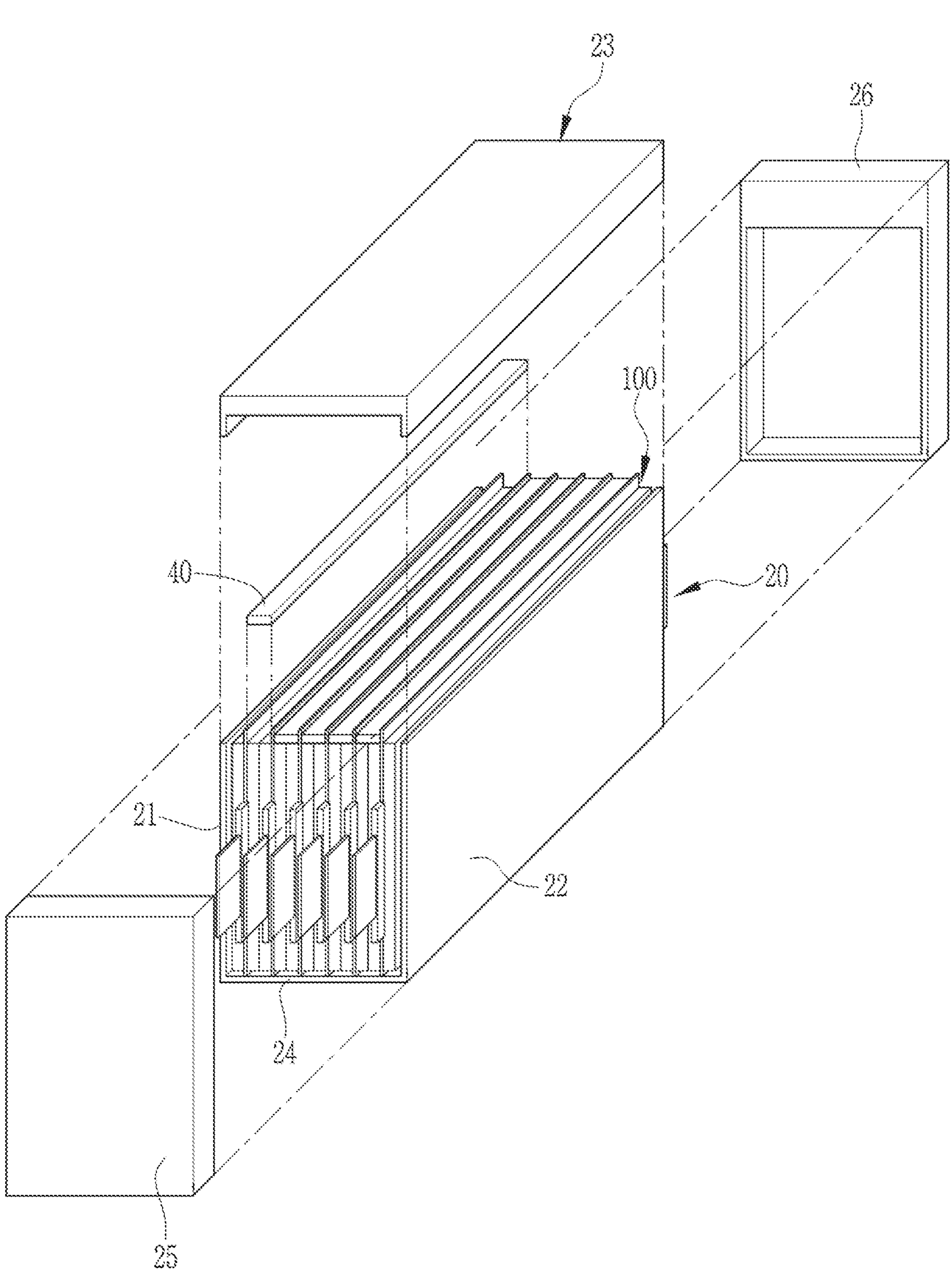
FIG. 17 is an exploded perspective view illustrating a secondary battery assembly module according to a fourth embodiment of the present disclosure.
Figure 18:
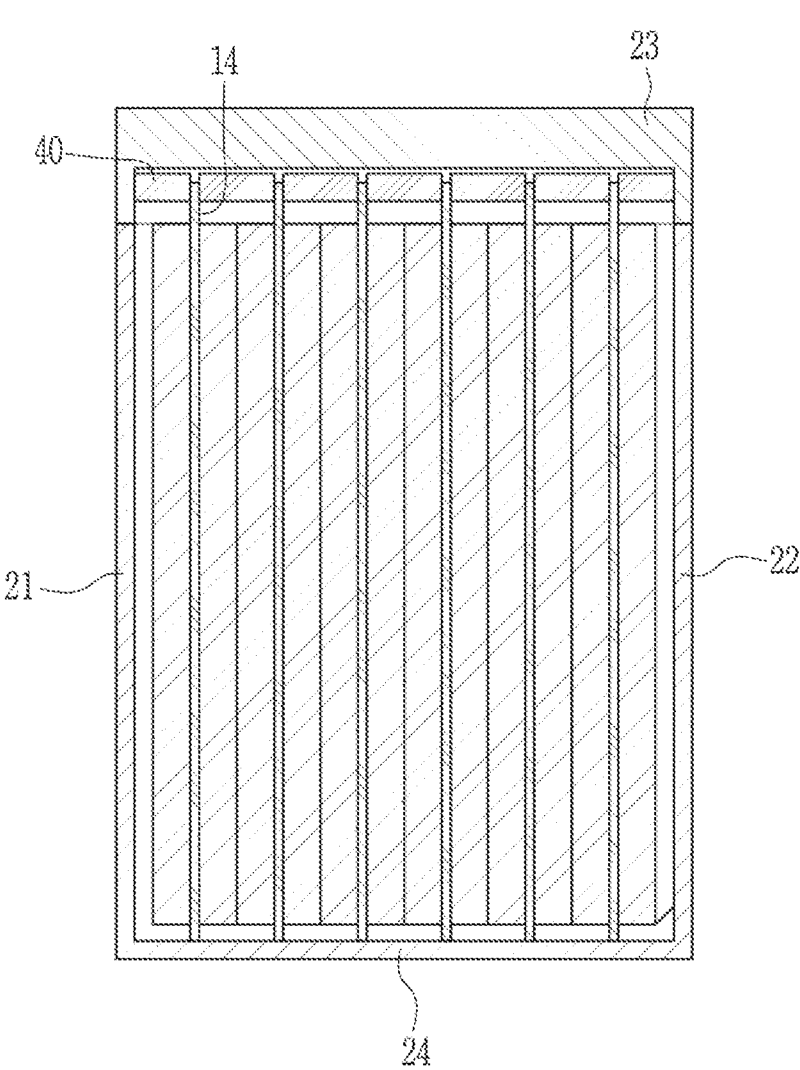
FIG. 18 is a sectional view illustrating the secondary battery assembly module according to the fourth embodiment of the present disclosure.

FIG. 17 is an exploded perspective view illustrating a secondary battery assembly module according to a fourth embodiment of the present disclosure. FIG. 18 is a sectional view illustrating the secondary battery assembly module according to the fourth embodiment of the present disclosure.

The secondary battery assembly module according to the fourth embodiment of the present disclosure may include: a secondary battery module formed by stacking a plurality of secondary batteries 10 in one direction; a first side cover 21 and a second side cover 22 covering a first side surface and a second side surface of the secondary battery module, respectively; an upper cover 23 and a lower cover 24 covering an upper portion and a lower portion of the secondary battery module, respectively; and a front cover 25 and a rear cover 26 covering a front surface and a rear surface of the secondary battery module, respectively. Each of the secondary batteries 10 may have, on a front surface or a rear surface thereof, an electrode tab including a tab sealing part 13, and a side sealing part 14 on a side surface thereof. A plurality of inner grooves 23*b* each of which is spaced apart from and faces the side sealing part 14 of each of the secondary batteries 10 stacked in one direction and each of which allows the side sealing part 14 to be inserted therein may be formed in the inner surface of the upper cover 23. A plurality of pressing bars 40 each of which has opposite ends coupled to front cover 25 and the rear cover 26, respectively, may be formed at a predetermined interval with the side sealing part 14 interposed therebetween. Here, the interval may be formed to be equal to or smaller than a width of the side sealing part 14.

That is, the plurality of pressing bars 40 may be coupled to the front and rear covers 25 and 26 of the secondary battery module and may substantially press the side sealing part 14 of each of the secondary batteries 10 in the lateral direction.

As illustrated in FIG. 17, each of the pressing bars 40 may extend in the longitudinal direction in which the side sealing part 14 of each of the secondary batteries 10 is formed, and the opposite ends of each of the pressing bars 40 may be coupled to the front cover 25 and the rear cover 26 of the secondary battery module. The pressing bars 40 may be spaced apart from each other at the predetermined interval in a direction in which the secondary batteries 10 are stacked so that the side sealing part 14 of each of the secondary batteries 10 is disposed in the predetermined interval.

Here, the pressing bars 40 may be formed with the side sealing part 14 interposed therebetween, so that the side sealing part 14 may be disposed in the interval between the pressing bars 40. With this structure, venting of the secondary battery 10 may be delayed as much as possible by suppressing, blocking, or delaying the physical expansion ability of the side sealing part 14 during expansion.

The side sealing part 14 may be formed between the pressing bars 40, and the pressing bars 40 may be formed in a circular rod shape to induce the side sealing part 14 to expand to the maximum volume thereof, so that curve surfaces of the pressing bars 40 may be in contact with opposite ends of the side sealing part 14.

The interval between the pressing bars 40 may be formed to correspond to the inner groove 31*a* of the venting delay device 30 of the embodiment of the present disclosure described above. That is, the interval between the pressing bars 40 may be equal to the width of the side sealing part 14 or may be smaller than the width of the side sealing part 14 so that the side sealing part 14 is pressed laterally.

In addition, since the secondary battery 10 and a secondary battery case 20 have already been described above, a repetitive description thereof will be omitted.

While exemplary embodiments of the present disclosure have been described above for the illustrative purposes, it will be understood by those skilled in the art that the present disclosure can be modified or changed in various forms without departing from the technical spirit of the present disclosure. Simple modifications or changes of the present disclosure belong to the scope of the present disclosure, and the detailed scope of the present disclosure will be more clearly understood by the accompanying claims.

What is claimed is:

1. A secondary battery assembly comprising:

a secondary battery having, at an end or each end thereof, an electrode tab including a tab sealing part, and a side sealing part bent on a side surface thereof to a predetermined length; and a venting delay device including a protrusion formed to be spaced apart from and face the side sealing part bent on the side surface thereof, wherein the side sealing part is configured to expand by an internal pressure of the secondary battery, and a bent portion of the side sealing part is configured to unfold and contact the protrusion.

2. The secondary battery assembly of claim 1, wherein the bent portion of the side sealing part is spaced a distance away from the protrusion that is equal to or less than a length of the bent portion.

3. The secondary battery assembly of claim 1, wherein the bent portion of the side sealing part is spaced a distance away from the protrusion that is less than a length of the bent portion.

4. The secondary battery assembly of claim 1, wherein the bent portion of the side sealing part is spaced a distance away from the protrusion that is equal to a length of the bent portion.

5. The secondary battery assembly of claim 1, wherein the protrusion and the bent portion of the side sealing part, which are spaced apart, face each other.

6. The secondary battery assembly of claim 5, wherein a width of the protrusion and a width of the bent portion at least overlap each other.

7. The secondary battery assembly of claim 1, wherein the venting delay device comprises at least one of more materials selected from the group consisting of a thermoplastic resin, a metal, and an aluminum silicate.

* * * * *